United States Patent [19]

Dolan et al.

[11] Patent Number: 5,368,720
[45] Date of Patent: * Nov. 29, 1994

[54] FIXED BED/MOVING BED REFORMING WITH HIGH ACTIVITY, HIGH YIELD TIN MODIFIED PLATINUM-IRIDIUM CATALYSTS

[75] Inventors: John F. Dolan, Baton Rouge, La.; Stuart S. Goldstein, Ewell, England; George A. Swan, III, Baton Rouge, La.

[73] Assignee: Exxon Research & Engineering Co., Florham Park, N.J.

[*] Notice: The portion of the term of this patent subsequent to Dec. 14, 2010 has been disclaimed.

[21] Appl. No.: 867,587

[22] Filed: Apr. 13, 1992

Related U.S. Application Data

[63] Continuation-in-part of Ser. No. 627,527, Dec. 14, 1990, abandoned.

[51] Int. Cl.$^5$ .............................................. C10G 35/085
[52] U.S. Cl. ........................................ 208/65; 208/63; 208/138; 208/139
[58] Field of Search .................... 208/65, 139, 138, 63

[56] References Cited

U.S. PATENT DOCUMENTS

| | | | |
|---|---|---|---|
| 3,718,578 | 2/1973 | Bussett | 208/139 |
| 3,992,465 | 11/1976 | Juguin et al. | 208/65 |
| 4,588,495 | 5/1986 | Franck et al. | 208/65 |
| 4,677,094 | 6/1987 | Moser et al. | 208/139 |
| 4,714,538 | 12/1987 | Moser et al. | 208/139 |
| 4,714,539 | 12/1987 | Moser et al. | 208/139 |
| 4,714,540 | 12/1987 | Moser et al. | 208/139 |
| 4,737,262 | 4/1988 | Franck et al. | 208/65 |
| 4,737,483 | 4/1988 | Moser et al. | 208/139 |
| 4,975,178 | 12/1990 | Chem et al. | 208/65 |
| 4,985,132 | 1/1991 | Moser et al. | 208/65 |

*Primary Examiner*—Helane Myers
*Attorney, Agent, or Firm*—Henry E. Naylor

[57] ABSTRACT

A two stage process for reforming a naphtha feed at low severities with tin modified platinum-iridium catalysts. In particular, both high selectivity, and high activity are manifested by such catalysts in reforming a naphtha feed at low severities in a first fixed-bed reforming stage which is comprised of a series of reforming zones, or reactors; i.e., within the dehydrogenation and ring isomerization zones of a reforming unit. The first stage zones are charged with a tin-containing platinum-iridium catalyst, and the naphtha feed reformed to produce an intermediate RON clear $C_5+$ liquid reformate. The intermediate octane product of the first reforming stage is passed to a second stage which is comprised of one or more moving-bed reforming zones, or reactors, which are operated in a continuous catalyst regeneration mode with platinum containing catalyst.

8 Claims, No Drawings

FIXED BED/MOVING BED REFORMING WITH HIGH ACTIVITY, HIGH YIELD TIN MODIFIED PLATINUM-IRIDIUM CATALYSTS

This is a continuation-in-part of U.S. Ser. No. 627,527, filed Dec. 14, 1990 now abandoned.

FIELD OF THE INVENTION

This invention relates to a two stage process for reforming petroleum feed streams boiling in the naphtha range, in the presence of high activity tin modified platinum-iridium catalysts. In particular, it relates to a low severity reforming process wherein these catalysts are employed in a first reforming stage comprised of one or more fixed-bed reforming zones containing a platinum-iridium-tin catalyst followed by reforming in a second reforming stage comprised of one or more moving-bed reforming zones.

BACKGROUND OF THE INVENTION

Catalytic reforming, or hydroforming, is a well-established industrial process employed by the petroleum industry for improving the octane quality of naphthas or straight run gasolines. In reforming, a multi-functional catalyst is employed which contains a metal hydrogenation/dehydrogenation (hydrogen transfer) component, or components, composited with a porous, inorganic oxide support, notably alumina. Platinum metal catalysts, or a catalyst which contains platinum to which one or more additional metal promoters have been added to form polymetallic catalysts, are conventionally employed in conducting reforming operations. In a reforming operation, one or a series of reactors constitute the reforming unit which provides a series of reaction zones. Typically, a series of reactors is employed, e.g., three or four reactors, these constituting the heart of the reforming unit. Each reforming reactor is generally provided with a fixed bed, or beds, of the catalyst, each receives down-flow feed, and each is provided with a preheater or interstage heater, because the reactions which take place are endothermic. A naphtha feed, with hydrogen, is concurrently passed through a preheat furnace and reactor, and then in sequence through subsequent interstage heaters and reactors of the series. The product from the last reactor is separated into a $C_5+$ liquid fraction which is recovered, and a vaporous effluent. The vaporous effluent is a gas rich in hydrogen, and usually contains small amounts of normally gaseous hydrocarbons, from which hydrogen is separated and recycled to the process.

Reforming is defined as the total effect of the molecular changes, or hydrocarbon reactions, produced by dehydrogenation of cyclohexanes and dehydroisomerization of alkylcyclopentanes to yield aromatics; dehydrogenation of paraffins to yield olefins; dehydrocyclization of paraffins and olefins to yield aromatics; isomerization of n-paraffins; isomerization of alkylcycloparaffins to yield cyclohexanes; isomerization of substituted aromatics; and hydrocracking of paraffins which produces gas, and inevitably coke, the latter being deposited on the catalyst. The recycled hydrogen suppresses, but cannot prevent the build up of coke.

The sum-total of the reforming reactions in most commercial operations occurs as a continuum between the first and last reaction zone of the series, i.e., as the feed enters and passes over the first fixed catalyst bed of the first reactor and exits from the last fixed catalyst bed of the last reactor of the series. During an on-oil run, the activity of the catalyst gradually declines due to the build-up of coke on the catalyst, and hence during operation, the temperature of the process is gradually raised to compensate for the activity loss caused by the coke deposition. Eventually, however, economics dictate the necessity of reactivating the catalyst. Consequently, in all processing of this type the catalyst must necessarily be periodically regenerated by burning off the coke in the presence of an oxygen-containing gas at controlled conditions. Catalyst reactivation is then completed in a sequence of steps wherein the metal hydrogenation/dehydrogenation components are atomically redispersed.

In the reforming operation, the reactions which predominate between the several reactors differ principally by the nature of the feed, and the temperature employed within the individual reactors. In the initial reaction zone, or first reactor, which is maintained at a relatively low temperature, it is believed that the primary reaction involves the dehydrogenation of naphthenes to produce aromatics. The isomerization of naphthenes, notably $C_5$ and $C_6$ naphthenes, also occurs to a considerable extent. Most of the other reforming reactions also occur, but only to a lesser, or smaller extent. There is relatively little hydrocracking, and very little olefin or paraffin dehydrocyclization occurs in the first reactor. Within the intermediate reactor zone(s), or reactor(s) of the first stage, the temperature is maintained somewhat higher than in the first reforming zone, or first reactor of the series, and it is believed that the principal reaction involves the isomerization of naphthenes, normal paraffins and isoparaffins. Some dehydrogenation of naphthenes may, and usually does occur, at least within the first of the intermediate reactors. There is usually some hydrocracking, at least more than in the first reactor of the series, and there is more olefin and paraffin dehydrocyclization. The tail reactor of the first stage is generally operated at a somewhat higher temperature than the second reactor of the series. It is believed that the naphthene and paraffin isomerization reactions continue as the primary reaction in this reactor, but there is very little naphthene dehydrogenation. There is a further increase in paraffin dehydrocyclization, and more hydrocracking. In the second reforming stage which is operated at the highest temperatures, it is believed that paraffin dehydrocyclization, particularly the dehydrocyclization of the short chain, notably $C_6$ and $C_7$ paraffins, is the primary reaction. The isomerization reactions continue, and there is more hydrocracking in the reforming zones of this stage than in any one of the reforming zones of the first stage. Unfortunately, dealkylation and hydrocracking reactions occur to some extent throughout all of the reforming zones of a unit.

It is, accordingly, a primary objective of this invention to provide an improved process for the manufacture of relatively high octane gasoline at high severity reforming conditions.

In particular, it is an object to provide a high severity reforming process for the production of relatively high octane gasoline by utilizing two reforming stages. The first reforming stage is comprised of one or more fixed-bed reforming zones containing a highly active supported platinum catalyst, promoted with iridium; and additionally, small, critical amounts of tin. The amount of tin is sufficient for this platinum-iridium-tin catalyst to produce an intermediate range octane (80-95 RON)

gasoline from low octane naphtha, while suppressing dealkylation in the lead reactors as well as moderating hydrocracking reactions which occur in downstream reforming zones.

A further object is to provide a process, as characterized, but further utilizing a platinum-tin catalyst in one or more of the moving-bed reforming zones of the second reforming stage. This fixed-bed/moving-bed process will produce greater yields of $C_5+$ reformate and hydrogen than otherwise similar two-stage processes except that they do not contain tin modified platinum-iridium catalysts in the reforming zones of the first stage. Also, cycle length of the first reforming stage will be increased by use of the platinum-iridium-tin catalyst.

THE INVENTION

These objects, and others, are achieved in accordance with the present invention, which embodies a two stage process for improving the octane quality of a naphtha comprising a mixture of paraffins, aromatics and naphthenes, which process comprises: (a) reforming said naphtha feed in a first reforming stage comprised of one or more fixed-bed reforming zones, wherein at least the lead reforming zone contains a tin-modified platinum-iridium catalyst, as defined hereafter, at effective reforming conditions; and (b) reforming the effluent stream of said first reforming stage in a second reforming stage comprised of one or more moving bed reforming zones in the presence of a platinum containing catalyst.

In its more preferred aspects, the reaction is conducted in two stages, the first reforming stage being constituted of a plurality of serially connected fixed-bed reactors each reactor provided with a catalyst whose composition is comprised of platinum and iridium modified with tin in an amount that when reforming at severity required to produce hydrogen and reformate of about 80 RON clear to about 95 RON clear, preferably about 85 RON clear to about 95 RON clear, is sufficient to suppress unwanted dealkylation and hydrocracking reactions. The second stage is comprised of one or more moving-bed reforming zones, or reactors, each zone containing a platinum containing catalyst which is continuously regenerated and reactivated. It will be understood that the terms "reforming zone" and "reforming reactor", are used interchangeably herein.

The catalyst used in the fixed-bed reforming zones is generally comprised of from about 0.1 percent to about 0.7 percent platinum, preferably from about 0.1 to about 0.5 percent platinum, from about 0.1 percent to about 0.7 percent iridium, preferably from about 0.1 to about 0.5 percent iridium, and from about 0.02 percent to about 0.4 percent tin, preferably from about 0.05 to about 0.3 percent tin, based on the total weight of the catalyst (dry basis), uniformly dispersed throughout a particulate solid support. Suitably, the weight ratio of the (platinum+iridium):tin will range from about 2:1 to about 15:1, preferably from about 4:1 to about 12:1, based on the total weight of platinum, iridium and tin in the catalyst composition. Furthermore, the catalyst will also contain halogen, preferably chlorine, in concentration ranging from about 0.1 percent to about 3 percent, preferably from about 0.8 to about 1.5 percent, based on the total weight of the catalyst. Preferably, the catalyst is also sulfided, e.g., by contact with a hydrogen sulfide-containing gas, and contains from about 0.01 percent to about 0.2 percent, more preferably from about 0.05 percent to about 0.15 percent sulfur, based on the total weight of the catalyst. The metal components, in the amounts stated, are uniformly dispersed throughout an inorganic oxide support, preferably an alumina support and more preferably a gamma alumina support.

The preferred catalyst for the second stage moving-bed reforming zones is platinum-tin on spherical alumina particles, wherein the platinum content ranges from about 0.01 to 1.0 wt. % and the tin content ranges from about 0.1 to 1.0 wt. %. It may also have a halogen content of about 0.1 to 3.0 wt. %. The spherical particles have an average diameter of about 1 to 3 mm, preferably about 1.5 to 2 mm, and a bulk density from about 0.5 to 0.9 and more particularly from about 0.5 to 0.8.

A process of this type results in the suppression of excessive dealkylation and hydrocracking reactions in the reforming zones of the first stage, thus permitting a simultaneous increase in yield of partially reformed $C_5+$ product and hydrogen as feed to the second stage which subsequently increases the $C_5+$ liquid and hydrogen yields overall.

The process of this invention requires the use, in the fixed-bed reactors in the first reforming stage, of platinum-iridium catalyst, modified or promoted with a relatively small and critical amount of tin, which is effective for suppressing cracking reactions leading to loss of $C_5+$ liquid and hydrogen selectivity, but which only mildly diminishes the superior activity and stability of platinum-iridium catalysts.

A preferred embodiment is the use of a tin-containing platinum catalyst in a moving bed paraffin dehydrocyclization second reforming stage where the catalyst is continuously circulated between the reactor or reactors and a regenerator to maintain high catalyst activity and selectivity to $C_5+$ liquid and hydrogen.

The support material for the platinum-iridium-tin catalyst of the first reforming stage is constituted of a porous, refractory inorganic oxide, particularly alumina. The support can contain, e.g., one or more components selected from alumina, bentonite, clay, diatomaceous earth, zeolite, silica, activated carbon, magnesia, zirconia, thoria, and the like, although the most preferred support is alumina to which, if desired, can be added a suitable amount of other refractory carrier materials such as silica, zirconia, magnesia, titania, etc., usually in a range of about 1 to 20 percent, based on the weight of the support. A preferred support for the practice of the present invention is one having a surface area of more than 50 $m^2/g$, preferably from about 100 to about 300 $m^2/g$, a bulk density of about 0.3 to 1.0 g/ml, preferably about 0.4 to 0.8 g/ml, an average pore volume of about 0.2 to 1.1 ml/g, preferably about 0.3 to 0.8 ml/g, and an average pore diameter of about 30 to 300 Angstrom units.

The metal hydrogenation-dehydrogenation components can be uniformly dispersed throughout the porous inorganic oxide support by various techniques known to the art such as ion-exchange, coprecipitation with the alumina in the sol or gel form, and the like. For example, the catalyst composite can be formed by adding together suitable reagents such as a salt of tin, and ammonium hydroxide or carbonate, and a salt of aluminum such as aluminum chloride or aluminum sulfate to form aluminum hydroxide. The aluminum hydroxide containing the tin salt can then be heated, dried, formed into pellets or extruded, and then calcined in air or nitrogen up to 540° C. The other metal components can then be added. Suitably, the metal components can be added to the catalyst by impregnation, typically via an "incipient wetness" technique which requires a minimum of solution so that the total solution is absorbed, initially or after some evaporation.

It is preferred, in forming the tin modified catalyst of the first reforming stage, to deposit the tin first, and the additional metals are then added to a previously pilled, pelleted, beaded, extruded, or sieved tin-containing particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique embodying absorption from a dilute or concentrated solution, or solutions, with subsequent filtration or evaporation to effect total uptake of the metallic components which are uniformly dispersed throughout the particulate solids support.

In the step of forming the tin-containing support, a tin salt, e.g., stannous chloride, stannic chloride, stannic tartrate, stannic nitrate, or the like, can be uniformly dispersed throughout a solid support or carrier by the method described in U.S. Pat. No. 4,963,249 which was issued on Oct. 16, 1990 to William C. Baird, Jr. et al., specific reference being made to Column 6, lines 15–23, and to Column 58 through Column 69, inclusively, herewith incorporated and made of reference.

Platinum in absolute amount is usually supported on the carrier within the range of from about 0.1 to about 0.7 percent, preferably from about 0.1 to about 0.5 percent, based on the weight of the catalyst (dry basis). Iridium, in absolute amount, is also usually supported on the carrier in concentration ranging from about 0.1 to about 0.7 percent, preferably from about 0.1 to about 0.5 percent, based on the weight of the catalyst (dry basis). The tin, where added to the support to form the first stage catalyst, preferably before addition of the platinum and iridium, is added to the support in concentration ranging from about 0.02 percent to about 0.4 percent, preferably from about 0.05 to about 0.3 percent, based on the total weight of the catalyst (dry basis). The weight ratio of the (platinum +iridium):tin suitably ranges from about 2:1 to about 15:1, preferably from about 4:1 to about 12:1, based on the total weight of the platinum, iridium, and tin in the catalyst composition.

To enhance catalyst performance in reforming operations, it is also required to add a halogen component to the catalysts, fluorine and chlorine being preferred halogen components. The halogen is contained on the catalyst within the range of 0.1 to 3 percent, preferably within the range of about 0.8 to about 1.5 percent, based on the weight of the catalyst. When using chlorine as the halogen component, it is added to the catalyst within the range of about 0.2 to 2 percent, preferably within the range of about 1 to 1.5 percent, based on the weight of the catalyst. The introduction of halogen into the catalyst can be carried out by any method at any time. It can be added to the catalyst during catalyst preparation, for example, prior to, following or simultaneously with the incorporation of a metal hydrogenation/dehydrogenation component, or components. It can also be introduced by contacting a carrier material in a vapor phase or liquid phase with a halogen compound such as hydrogen fluoride, hydrogen chloride, ammonium chloride, or the like.

The catalyst is dried by heating at a temperature above about 25° C., preferably between about 65° C. and 150° C., in the presence of nitrogen or oxygen, or both, in an air stream or under vacuum. The catalyst is calcined at a temperature between about 200° C. and 455° C., either in the presence of oxygen in an air stream or in the presence of an inert gas such as nitrogen.

Sulfur is a highly preferred component of the catalyst, the sulfur content of the catalyst generally ranging to about 0.2 percent, preferably from about 0.05 percent to about 0.15 percent, based on the weight of the catalyst (dry basis). The sulfur can be added to the catalyst by conventional methods, suitably by breakthrough sulfiding of a bed of the catalyst with a sulfur-containing gaseous stream, e.g., hydrogen sulfide in hydrogen, performed at temperatures ranging from about 175° C. to about 565° C., and at pressures ranging from about 1 to about 40 atmospheres for the time necessary to achieve breakthrough, or the desired sulfur level.

The feed or charge stock to the first stage can be a virgin naphtha, cracked naphtha, a naphtha from a coal liquefaction process, a Fischer-Tropsch naphtha, or the like. Typical feeds are those hydrocarbons containing from about 5 to about 12 carbon atoms, or more preferably from about 6 to about 9 carbon atoms. Naphthas, or petroleum fractions boiling within the range of from about 25° C. to about 235° C., and preferably from about 50° C. to about 190° C., contain hydrocarbons of carbon numbers within these ranges. Typical fractions thus usually contain from about 15 to about 80 vol. % paraffins, both normal and branched, which fall in the range of about $C_5$ to $C_{12}$, from about 10 to 80 vol. % of naphthenes falling within the range of from about $C_6$ to $C12$, and from 5 through 20 vol. % of the desirable aromatics falling within the range of from about $C_6$ to $C_{12}$.

The reforming runs are initiated by adjusting the hydrogen and feed rates, and the reaction temperature (Equivalent Isothermal Temperature, EIT) and pressure to operating conditions. The run is continued at optimum reforming conditions by adjustment of the major process variables, within the ranges described below:

| OPERATING CONDITIONS FOR FIRST STAGE | | |
| --- | --- | --- |
| Major Operating Variables | Typical Process Conditions | Preferred Process Conditions |
| Pressure, psig | 100–700 | 150–500 |
| Reaction Temp. (EIT), °C. | 370–540 | 425–510 |
| Recycle Gas Rate, SCF/B | 1,000–10,000 | 2,000–6,000 |
| Feed Rate, W/Hr/W | 1–20 | 2–15 |

The major operating variables, in accordance with the practice of this invention are selected to provide a combination of values which will produce in the dehydrogenation and ring isomerization zone, or zones, which contain a tin modified platinum-iridium catalyst, an RON clear octane number ranging from about 80 to about 95, preferably from about 85 to about 95. In other words, a combination of values are selected which provides an RON clear octane number reformate product from the first reforming stage, containing a tin modified platinum-iridium catalyst, ranging from about 80 to about 95, preferably from about 85 to about 95. This intermediate octane reformate, in a preferred operation, is then processed in the dehydrocyclization second reforming stage, in a moving bed with continuously regenerated tin-containing platinum catalyst. Pursuant to operations at these conditions, the first reforming stage will produce at the lower severity conditions greater yields of $C_5+$ reformate, generally up to about 2 vol. percent, or greater, with 40–50% increase in cycle length than processes otherwise similar except that they do not contain a tin modified platinum-iridium catalyst; and this selectivity advantage will remain, or persist, even after the reformate is processed at higher severities in the second reforming stage with a tin-containing platinum catalyst in a moving bed with continuous catalyst regeneration.

Moving-bed reforming zones, or reactors, are well known in the art and are typical of those taught in U.S. Pat. Nos. 3,652,231; 3,856,662; 4,167,473; and 3,992,465 which are all incorporated herein by reference. Reforming conditions for the moving-bed reforming zones will include temperatures from about 425° to 650° C., preferably from about 425° to 540° C.; pressures from about 30 to 300, preferably from about 50 to 200 psig; a weight hourly space velocity from about 0.5 to 20, preferably from about 0.75 to 6. Hydrogen-rich gas should be provided to maintain the hydrogen to oil ratio between the range of about 0.5 to 5, preferably from about 0.75 to 3. The general principle of operation of such reforming zones is that the catalyst is contained in a annular bed formed by spaced cylindrical screens within the reactor. The reactant stream is processed through the catalyst bed, typically in an out-to-in radial flow, that is, it enters the reactor at the top and flows radially from the reactor wall through the annular bed of catalyst which is descending through the reactor, and passes into the cylindrical space created by said annular bed. It exits the bottom of the reforming zone and is passed to a catalyst regeneration zone where it is subjected to one or more steps common to the practice of reforming catalyst regeneration. The catalyst regeneration zone represents all of the steps required to remove at least a portion of the carbon from the catalyst and return it to the state needed for the reforming reactions occurring in the moving-bed reforming zone(s). The specific steps included in catalyst regeneration will vary with the selected catalyst. The only required step is one where accumulated carbon is burned-off at temperatures from about 330° to 650° C. and in the presence of an oxygen-containing gas, preferably air. Additional steps which may also be contained in the catalyst regeneration equipment represented by catalyst regeneration include, but are not limited to, adding a halide to the catalyst, purging carbon oxides, redispersing metals, and adding sulfur or other compounds to lower the rate of cracking when the catalyst first enters the reforming zone.

The selection of the combination of major operating variables required to produce a target octane for this two stage process is per se well within the skill of the art. For example, a selection made between temperature and space velocity can be used to produce an overall RON clear octane product in the range of 95 to 105, as desired. Total pressure, and the hydrogen:oil ratio, or combinations of these major operating values with other operating values can also be employed to produce a target octane number for the reformate product.

The inventive process will be more fully understood by reference to the following examples, illustrating its more salient features. In the examples which follow all parts are given in terms of weight units, pressures in terms of pounds per square inch gauge, and temperatures in Fahrenheit degrees except as otherwise expressed.

EXAMPLES

Inspections on a full range Arab Light naphtha feed employed in making these tests are given below:

| Property | Arab Light Naphtha |
| --- | --- |
| Gravity at 16° C. | |
| API° | 59.4 |
| Specific | 0.7412 |
| Octane, RON Clear | 38 |
| Molecular Weight | 111.3 |
| Sulfur, wppm | 0.3 |
| Distillation D-86, °C. | |
| IBP | 90 |
| 5% | 216 |
| 10% | 105 |
| 50% | 125 |
| 90% | 154 |
| 95% | 160 |
| FBP | 171 |
| Composition, Wt. % | |
| Total Paraffins | 65.1 |
| Total Naphthenes | 19.3 |
| Total Aromatics | 15.6 |

Example 1

The first stage of two stage reforming process was operated on an Arab Light naphtha with Catalyst A which contained 0.3 wt. % platinum, 0.3 wt. % iridium, and 1.0 wt. % chloride (all based on total weight of catalyst) on a gamma alumina support formed as 1/16″ diameter cylindrical extrudates. Prior to startup, the catalyst was sulfided to detectable sulfur breakthrough at the outlet of the last reactor in the series with a stream containing hydrogen sulfide and hydrogen. Total pressure and gas rate were adjusted to maintain hydrogen partial pressure in the range of 180–200 psig, and product octane was maintained at 90 RON clear by progressively increasing reaction temperature.

Example 2

The first stage of two stage reforming process was operated as in Example 1, but with Catalyst B which contained 0.3% platinum, 0.3 wt. % iridium, 0.1 wt. % tin, and 1.0 wt. % chloride (all based on total weight of catalyst) on a gamma alumina support formed as 1/16″ diameter extrudates. Catalyst B was prepared in a sequential procedure wherein tin was first incorporated into the alumina support which was subsequently impregnated with platinum and iridium as described previously. Catalyst B was also sulfided. Operating conditions of Example 1 were repeated, and the performance was compared by collecting first stage product:

| First Stage Catalyst | $C_5+$ Liquid Yield at 90 RON Clear |
| --- | --- |
| A | 78.0 |
| B | 81.4 |

Clearly replacing Catalyst A with Catalyst B resulted in less hydrocracking and preserved additional $C_5+$ components as feed to the moving bed second reforming stage, such that overall liquid and hydrogen yields are elevated by using Catalyst B in the first, fixed bed reforming stage.

It is apparent that various modifications and changes can be made without departing from the spirit and scope of the invention.

What is claimed is:

1. A two stage process for improving the octane quality of a naphtha feedstock comprised of a mixture of paraffins, aromatics and naphthenes in a reforming first stage of fixed-bed reforming zones and a second stage comprised of one or more moving-bed reforming zones, the process comprising;

(a) reforming said naphtha feedstock in a first reforming stage comprised of one or more fixed-bed reforming zones serially connected to one another, which fixed-bed reforming zones contain a catalyst comprised of about 0.1 percent to about 0.7 percent platinum, from about 0.1 percent to about 0.7 percent iridium, and from about 0.02 percent to about 0.4 percent tin, based on the total weight of the catalyst, wherein each of said metals is composited with and uniformly dispersed through-out an inorganic oxide support, thereby producing an effluent stream; and (b) reforming said effluent stream in a second reforming stage comprised of one or more serially connected reforming zones which are operated in a moving-bed continual catalyst regeneration mode, which catalyst is comprised of one or more Group VIII noble metals on substantially spherical refractory support particles, wherein the catalyst continually descends through the reforming zone, exits, and is passed to a regeneration zone where it is regenerated by burning-off at least a portion of any accumulated carbon, and wherein the regenerated catalyst is continually recycled back to the one or more reforming zones.

2. The process of claim 1 wherein the catalyst of the fixed-bed reforming stage contains from about 0.1 percent to about 0.5 percent platinum, from about 0.1 percent to about 0.5 percent iridium, and from about 0.05 to about 0.3 percent tin.

3. The process of claim 1 wherein the catalyst in the moving-bed, continuously regenerated second reforming stage contains from about 0.1 to about 1.0 percent platinum, and from about 0.1 percent to about 1.0 percent tin on substantially spherical alumina particles.

4. The process of claim 3 wherein the catalyst in the moving-bed reactor zones contain from about 0.1 percent to about 0.6 percent platinum, and from about 0.1 percent to about 0.6 percent tin.

5. The process of claim 1 wherein the catalyst contains from about 0.1 percent to about 3 percent halogen.

6. The process of claim 5 wherein the catalyst contains from about 0.8 percent to about 1.5 percent halogen.

7. The process of claim 1 wherein the catalyst is sulfided, and contains from about 0.01 percent to about 0.2 percent sulfur.

8. The process of claim 7 wherein the catalyst contains from about 0.05 percent to about 0.15 percent sulfur.

* * * * *